(12) United States Patent
Lee et al.

(10) Patent No.: US 10,096,831 B2
(45) Date of Patent: Oct. 9, 2018

(54) CATHODE ACTIVE MATERIAL AND LITHIUM SECONDARY BATTERY FOR CONTROLLING IMPURITY OR SWELLING INCLUDING THE SAME AND METHOD OF PREPARING CATHODE ACTIVE MATERIAL WITH ENHANCED PRODUCTIVITY

(71) Applicant: LG CHEM, LTD., Seoul (KR)

(72) Inventors: DaeJin Lee, Paju-si (KR); SungJoong Kang, Daejeon (KR); JooHong Jin, Daejeon (KR); Hong Kyu Park, Daejeon (KR)

(73) Assignee: LG CHEM, LTD., Seoul (KR)

(*) Notice: Subject to any disclaimer, the term of this patent is extended or adjusted under 35 U.S.C. 154(b) by 1174 days.

(21) Appl. No.: 14/264,588

(22) Filed: Apr. 29, 2014

(65) Prior Publication Data

US 2014/0234718 A1 Aug. 21, 2014

Related U.S. Application Data

(63) Continuation of application No. PCT/KR2013/000316, filed on Jan. 16, 2013.

(30) Foreign Application Priority Data

Jan. 17, 2012 (KR) .................. 10-2012-0005070
Jun. 18, 2012 (KR) .................. 10-2012-0064727

(51) Int. Cl.
*H01M 4/58* (2010.01)
*H01M 4/525* (2010.01)
(Continued)

(52) U.S. Cl.
CPC .......... *H01M 4/5825* (2013.01); *C01D 15/08* (2013.01); *C01G 53/006* (2013.01); *C01G 53/50* (2013.01);
(Continued)

(58) Field of Classification Search
None
See application file for complete search history.

(56) References Cited

U.S. PATENT DOCUMENTS 5,631,105 A * 5/1997 Hasegawa ............. H01M 4/485
423/594.15
8,026,008 B2 9/2011 Kim et al.
(Continued)

FOREIGN PATENT DOCUMENTS

EP   2 357 692 B1   9/2014
JP   9-92285 A      4/1997
(Continued)

OTHER PUBLICATIONS

Woo et al, Improvement of electrochemical and thermal properties of Li(Ni0.8Co0.1 Mn0.1))2 positive electrode materials by multiple metal (Al,Mg) substitution, 2009, Electrochim Acta, 54, 3851-3856.*
(Continued)

*Primary Examiner* — Daniel S Gatewood
(74) *Attorney, Agent, or Firm* — Birch, Stewart, Kolasch & Birch, LLP

(57) ABSTRACT

Disclosed are a cathode active material represented by Formula 1 below and including a metal cation having a greater ionic radius than a Ni cation and represented by M of Formula 1 at a Li cation site or in an empty space within a crystal lattice so as to prevent mixing of Ni cations into a Li layer, a lithium secondary battery including the same, and a method of preparing the cathode active material which has improved productivity.

$$Li_a Ni_x Mn_y Co_z M_w O_{2-t} A_t \qquad (1)$$

wherein a, x, y, w, M, A, z, and t are the same as defined in the specification.

14 Claims, 2 Drawing Sheets

(51) Int. Cl.
*H01M 4/505* (2010.01)
*C01D 15/08* (2006.01)
*C01G 53/00* (2006.01)
*H01M 10/052* (2010.01)
*H01M 4/36* (2006.01)

(52) U.S. Cl.
CPC ........... *H01M 4/505* (2013.01); *H01M 4/525* (2013.01); *C01P 2002/52* (2013.01); *C01P 2002/72* (2013.01); *C01P 2002/74* (2013.01); *C01P 2006/40* (2013.01); *H01M 4/364* (2013.01); *H01M 10/052* (2013.01)

(56) References Cited

U.S. PATENT DOCUMENTS

| | | |
|---|---|---|
| 2003/0031930 A1 | 2/2003 | Hamano et al. |
| 2005/0014065 A1 | 1/2005 | Jung et al. |
| 2006/0233696 A1 | 10/2006 | Paulsen et al. |
| 2006/0275667 A1* | 12/2006 | Watanabe .......... C01G 45/1228 429/231.3 |
| 2009/0035659 A1* | 2/2009 | Takeuchi ................ H01B 1/122 429/223 |
| 2010/0297510 A1 | 11/2010 | Kim et al. |
| 2011/0269018 A1 | 11/2011 | Kono et al. |
| 2012/0175552 A1 | 7/2012 | Fukuchi et al. |

FOREIGN PATENT DOCUMENTS

| | | |
|---|---|---|
| JP | 9-092285 A | 4/1997 |
| JP | 11-307094 A | 11/1999 |
| JP | 2004-531034 A | 10/2004 |
| JP | 2005-327644 A | 11/2005 |
| JP | 2006-351487 A | 12/2006 |
| JP | 2009-32467 A | 2/2009 |
| JP | 2001-233369 A | 11/2011 |
| JP | 2012-509565 A | 4/2012 |
| KR | 2002-0093602 A | 12/2002 |
| KR | 10-2007-0109854 A | 11/2007 |
| KR | 10-2010-0042145 A | 4/2010 |
| WO | WO 02/103823 A2 | 12/2002 |
| WO | 2007/129848 A1 | 11/2007 |
| WO | WO 2010/058993 A2 | 5/2010 |
| WO | WO 2010/147179 A1 | 12/2010 |

OTHER PUBLICATIONS

Fey et al., "Electrochemical Performance of $Sr^{2+}$-doped $LiNi_{0.8}Co_{0.2}O_2$ as a Cathode Material for Lithium Batteries Synthesized via a Wet Chemistry Route Using Oxalic Acid," Materials Letters, vol. 52, Jan. 2002, pp. 197-202.

Rongbin et al., "Preparation and Electrochemical Properties of Barium-doped $LiNi\_(0.8)Co\_(0.2)O\_2$ Cathode Materials," Chinese Journal of Rare Metals, Jun. 2007, 3 pages.

Woo et al., "Improvement of Electrochemical and Thermal Properties of $Li[Ni_{0.8}Co_{0.1}Mn_{0.1}]O_2$ Positive Electrode Materials by Multiple Metal (Al, Mg) Substitution," Electrochimica Acta, vol. 54, Available online Jan. 24, 2009, pp. 3851-3856.

International Search Report issued in PCT/KR2013/000316, dated Apr. 12, 2013.

* cited by examiner

[FIG.1]
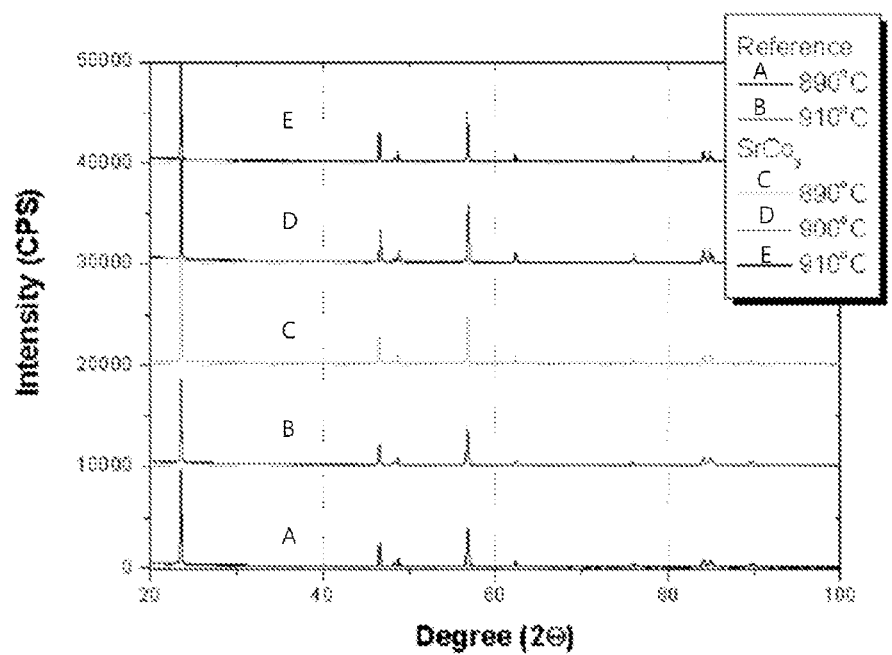

【FIG.2】
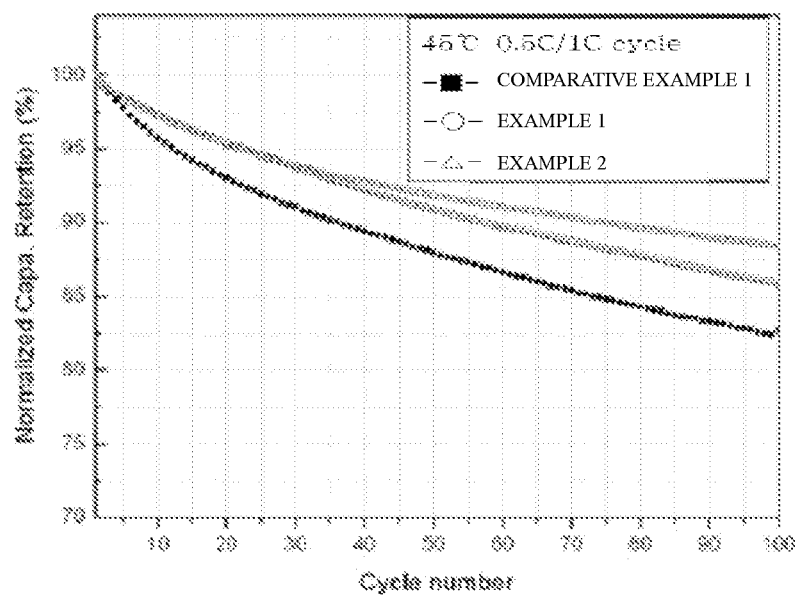
【FIG.3】
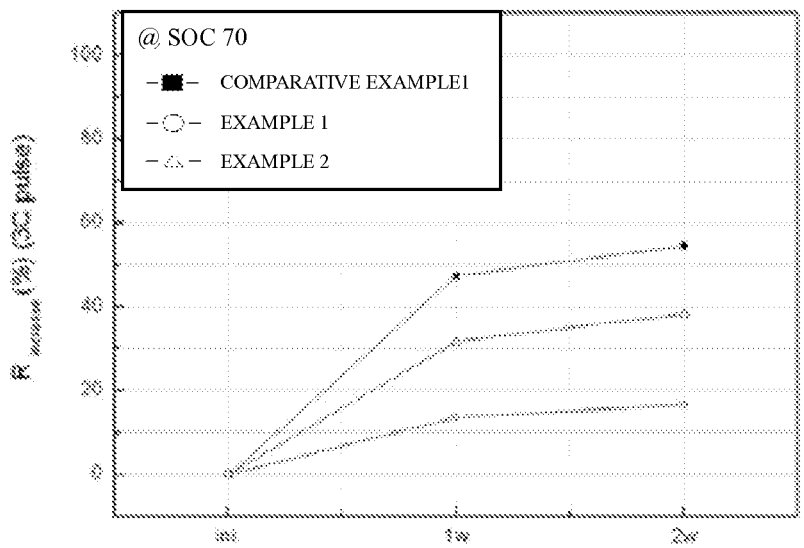

CATHODE ACTIVE MATERIAL AND LITHIUM SECONDARY BATTERY FOR CONTROLLING IMPURITY OR SWELLING INCLUDING THE SAME AND METHOD OF PREPARING CATHODE ACTIVE MATERIAL WITH ENHANCED PRODUCTIVITY

CROSS REFERENCE TO RELATED APPLICATIONS

This application is a Bypass Continuation of PCT International Application No. PCT/KR2013/000316 filed on Jan. 16, 2013, which claims priority under 35 U.S.C § 119(a) to Patent Application No. 10-2012-0005070 filed in the Republic of Korea on Jan. 17, 2012, and under 35 U.S.C § 119(a) to Patent Application No. 10-2012-0064727 filed in the Republic of Korea on Jun. 18, 2012, all of which are hereby expressly incorporated by reference into the present application.

TECHNICAL FIELD

The present invention relates to a cathode active material represented by a specific formula and including a metal cation having a greater ionic radius than a Ni cation at a Li cation site or in an empty space within a crystal lattice so as to prevent mixing of Ni cations into a Li layer, a lithium secondary battery including the same, and a method of preparing the cathode active material which has enhanced productivity.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential and have long cycle lifespan and low self-discharge rate, are commercially available and widely used.

In addition, as interest in environmental problems is increasing recently, research into electric vehicles and hybrid electric vehicles that can replace vehicles using fossil fuels, such as gasoline vehicles, diesel vehicles, and the like, which are one of the main causes of air pollution, is underway. As a power source of electric vehicles, hybrid electric vehicles, and the like, a nickel-metal hydride (Ni-MH) secondary battery is mainly used. However, research into lithium secondary batteries having high energy density and high discharge voltage is actively carried out and some of the lithium secondary batteries are commercially available.

As a cathode active material of a lithium secondary battery, a lithium-containing cobalt oxide ($LiCoO_2$) is mainly used. In addition, use of lithium-containing manganese oxides such as $LiMnO_2$ having a layered crystal structure, $LiMn_2O_4$ having a spinel crystal structure, and the like, and lithium-containing nickel oxides such as $LiNiO_2$ is also being considered.

Among these cathode active materials, $LiCoO_2$ has excellent lifespan characteristics and high charge and discharge efficiency and thus is most widely used. However, $LiCoO_2$ has low safety at high temperature and cobalt used as a raw material thereof is expensive due to limited reserves, and thus, $LiCoO_2$ has limitation in price competitiveness.

Lithium manganese oxides such as $LiMnO_2$, $LiMn_2O_4$, and the like have high thermal stability and are inexpensive and easy to synthesize, while having low capacity, poor high-temperature characteristics and low conductivity.

In addition, $LiNiO_2$-based cathode active materials are relatively cheap and exhibit excellent battery characteristics such as high discharge capacity. However, swelling due to occurrence of cation mixing in which some Li cation sites are substituted with Ni cations, deterioration of high-rate discharge characteristics, and rapid phase transition of a crystal structure according to volumetric change through repeated charge and discharge occur. In addition, when exposed to air and moisture, stability of such cathode active materials is dramatically reduced.

To address these problems, use of a lithium oxide containing Ni—Mn in a mix ratio of 1:1 or Ni—Co—Mn in a mix ratio of 1:1:1 as a cathode active material has been tried and research thereinto has been underway.

Batteries including a cathode active material prepared by mixing Ni, Co, or Mn exhibit superior cycle and capacity characteristics to a battery manufactured using a cathode active material prepared using each of the transition metals (Ni, Co, and Mn). Even in this case, however, when used for extended periods of time, cycle characteristics are rapidly deteriorated and problems such as swelling by gas generation due to cation mixing, deterioration of high-rate discharge characteristics, and the like have yet to be sufficiently addressed.

DISCLOSURE

Technical Problem

The present invention aims to address the aforementioned problems of the related art and to achieve technical goals that have long been sought.

As a result of a variety of intensive studies and various experiments, the inventors of the present invention confirmed that, when a $LiNiO_2$-based cathode active material having a specific composition is doped with a predetermined alkaline earth metal, intercalation of Ni cations into a Li layer is prevented and thus battery performance is enhanced.

In addition, the inventors of the present invention confirmed that, when a cathode active material is synthesized by adding a predetermined alkaline earth metal, sintering temperature may be reduced, thus completing the present invention.

Technical Solution

In accordance with one aspect of the present invention, provided is a cathode active material represented by Formula 1 below and including a metal cation having a greater ionic radius than a Ni cation and represented by M of Formula 1 at a Li cation site or in an empty space within a crystal lattice so as to prevent mixing of Ni cations into a Li layer.

$$Li_aNi_xMn_yCo_zM_wO_{2-t}A_t \qquad (1)$$

In Formula 1 above,

$0 \leq a \leq 1.2$, $0 < x \leq 0.9$, $0 < y \leq 0.9$, $0 < z \leq 0.9$, $0 < w \leq 0.3$, $2 \leq a+x+y+z+w \leq 2.3$, $x > y$, $x > z$, and $0 \leq t < 0.2$;

M is at least one metal cation having an oxidation number of +2; and A is at least one monovalent or divalent anion.

In the crystal structure of the cathode active material, the metal cation is mainly positioned at a Li cation site or in an empty space within a crystal lattice to form charge balance and thus cation mixing in which Ni cations are intercalated into Li cation sites may be minimized. In this regard, the Ni cation is $Ni^{2+}$ having an oxidation number of +2.

The metal cation acts as a filler in the crystal lattice and thus may contribute to structural stability of the cathode active material and minimize natural loss of Li cations. As a result, in a lithium secondary battery including the cathode active material, swelling due to impurities produced according to natural loss of Li cations, such as $Li_2CO_3$ and LiOH, is minimized, which results in enhanced safety.

The metal cation is a cation of an alkaline earth metal having a greater ionic radius than the Ni cation ($Ni^{2+}$) and an oxidation number of +2. According to experimental results obtained by the inventors of the present invention, as ionic radius of the metal cation increases, natural loss of Li cations may decrease. Thus, the metal cation is more preferably $Sr^{+2}$ or $Ba^{2+}$.

In addition, in Formula 1 above, oxygen ions may be substituted with anions A having an oxidation number of −1 or −2 within a predetermined range. In this regard, anions A may be each independently at least one selected from the group consisting of halogens such as F, Cl, Br, and I, S, and N.

Due to substitution of such anions, bonding strength between the anions and the transition metal is increased and structural transition of the compound of Formula 1 is prevented and, accordingly, lifespan of the lithium secondary battery may be enhanced. On the other hand, when the substitution amount of anions A is too large (t≥0.2), lifespan characteristics of the lithium secondary battery may be rather deteriorated due to unstable crystal structure.

Any materials satisfying Formula 1 above may be used as the cathode active material without limitation. Preferably, the cathode active material of Formula 1 where y+z≤0.6, more preferably y+z≤0.44 is used.

In addition, the cathode active material may further include a Li-containing compound due to natural loss of Li cations, or the like. The amount of the Li-containing compound may be less than 4 wt % based on a total weight of the cathode active material. In particular, the Li-containing compound may be $Li_2CO_3$ and/or LiOH.

As confirmed by experimental examples below, the cathode active material of Formula 1 has a greater X-ray diffraction peak ratio (003)/(014) than that of a cathode active material represented by Formula 2 below prepared under the same sintering temperature conditions.

$$Li_aNi_xMn_yCo_zO_{2-t}A_t \quad (2)$$

In Formula 2 above,

0≤a≤1.2, 0<x≤0.9, 0<y≤0.9, 0<z≤0.9, a+x+y+z=2, x>y, x>z, and 0≤t<0.2;

A is at least one monovalent or divalent anion.

The present invention also provides a cathode mixture for secondary batteries including the cathode active material described above and a cathode for secondary batteries including the cathode mixture.

The cathode mixture may selectively include a conductive material, a binder, a filler, and the like, in addition to the cathode active material.

The amount of the conductive material is generally 1 wt % to 30 wt % based on the total weight of a mixture including a cathode active material. The conductive material is not particularly limited so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between the active material and the conductive material and in binding of the active material to a current collector. The binder is typically added in an amount of 1 to 30 wt % based on the total weight of the mixture including the cathode active material. Examples of the binder include, but are not limtied to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The cathode may be manufactured by coating, on a cathode current collector, a slurry prepared by mixing a cathode mixture including the compounds described above with a solvent such as NMP or the like and drying and rolling the coated cathode current collector.

The cathode current collector is generally fabricated to a thickness of 3 to 500 μm. The cathode current collector is not particularly limited so long as it does not cause chemical changes in the fabricated lithium secondary battery and has conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The present invention also provides a lithium secondary battery including the cathode, an anode, a separator, and a lithium salt-containing non-aqueous electrolyte. The lithium secondary battery may have a capacity retention ratio with respect to initial capacity of 85% or more at 50 cycles performed under the following conditions: at 45° C., charging at 0.5 C and discharging at 1.0 C.

The anode may be manufactured by, for example, coating an anode mixture including an anode active material on an anode current collector and drying the coated anode current collector. As desired, the above-described components may be included in the anode mixture.

Examples of the anode active material include, but are not limited to, carbon such as hard carbon and graphite-based carbon; metal composite oxides such as $Li_xFe_2O_3$ where 0≤x≤1, $Li_xWO_2$ where 0≤x≤1, $Sn_xMe_{1-x}Me'_yO_z$ where Me: Mn, Fe, Pb, or Ge; Me': Al, B, P, Si, Group I, Group II and Group III elements, or halogens; 0<x≤1; 1≤y≤3; and 1≤z≤8; lithium metal; lithium alloys; Si-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin-based polymer such as polypropylene, glass fibers or polyethylene, which have chemical resistance and hydrophobicity, are used. When a solid electrolyte such as polymer or the like is used, the solid electrolyte may serve as both an electrolyte and a separator.

The lithium salt-containing non-aqueous electrolyte is composed of a non-aqueous electrolyte and a lithium salt. As the non-aqueous electrolyte, a non-aqueous organic solvent, an organic solid electrolyte, or an inorganic solid electrolyte may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The lithium secondary battery according to the present invention may be used in battery cells used as a power source of small devices and may also be suitable for use as a unit cell in medium and large-scale battery modules including a plurality of battery cells.

The present invention also provides a battery pack including the battery module as a power source of medium and large-scale devices. Examples of medium and large-scale devices include, but are not limited to, electric vehicles (EVs), hybrid electric vehicles (HEVs), plug-in hybrid electric vehicles (PHEVs), and apparatuses for storing power.

The present invention also provides a method of preparing a cathode active material, having enhanced productivity through reduction in synthesis temperature.

According to the preparation method, the cathode active material is prepared by adding an alkaline earth metal source having an oxidation number of +2 to a mixture of a transition metal source and a lithium source and sintering the resulting mixture in air.

The inventors of the present invention confirmed that, when a cathode active material is prepared through addition of the alkaline earth metal and sintering of the resulting mixture, sintering temperature reduction effects are obtained. Thus, according to the preparation method of the cathode active material, productivity enhancement effects are obtained by reducing sintering temperature.

The transition metal source is not particularly limited. However, when the transition metal source consists of at least two transition metals, the transition metal source is prepared by coprecipitation. The transition metal source may be a transition metal hydroxide represented by Formula 3 below:

$$M(OH)_2 \text{ where } M=Ni_xMn_yCo_z \text{ and } x+y+z=1 \qquad (3).$$

In addition, the alkaline earth metal source may be $SrCO_3$ or $BaCO_3$ and, in some cases, may be a mixture thereof.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing X-ray diffraction (XRD) analysis results of cathode active materials prepared according to Example 2 and Comparative Examples 1 and 2 through sintering at 890° C., 900° C., and 910° C.;

FIG. 2 is a graph showing lifespan characteristics of lithium secondary batteries including the cathode active materials of Examples 4 and 5 and Comparative Example 3; and FIG. 3 is a graph showing storage characteristics of the lithium secondary batteries of Examples 4 and 5 and Comparative Example 3.

MODE FOR INVENTION

Now, the present invention will be described in more detail with reference to the accompanying drawings and the following examples. These examples are only provided for illustration of the present invention and should not be construed as limiting the scope and spirit of the present invention.

EXAMPLE 1

0.5 wt % of $M(OH)_2$ where $M=Ni_{0.6}Mn_{0.2}Co_{0.2}$, which is a transition metal hydroxide, was prepared as a transition metal precursor. The metal hydroxide, 0.5 wt % of $MgCO_3$ as a doping metal source, and $Li_2CO_3$ as a lithium source were mixed in a stoichiometric ratio and the mixture was sintered in air at 890° C. to 930° C. for 10 hours, thereby completing preparation of an Mg-doped cathode active material.

EXAMPLE 2

A Sr-doped cathode active material was prepared in the same manner as in Example 1, except that 0.5 wt % of $SrCO_3$ was used as a doping metal source.

EXAMPLE 3

A Ba-doped cathode active material was prepared in the same manner as in Example 1, except that 0.5 wt % of $BaCO_3$ was used as a doping metal source.

COMPARATIVE EXAMPLE 1

$M(OH)_2$ where $M=Ni_{0.6}Mn_{0.2}Co_{0.2}$, which is a transition metal hydroxide, and $Li_2CO_3$ were mixed in a stoichiometric ratio and the mixture was sintered in air at 910° C. for 10 hours, thereby completing preparation of a cathode active material.

COMPARATIVE EXAMPLE 2

A cathode active material was prepared in the same manner as in Comparative Example 1, except that the sintering process was performed at 850° C. to 900° C. for 10 hours.

EXPERIMENTAL EXAMPLE 1

The amounts of impurities $Li_2CO_3$ and LiOH of the cathode active materials prepared according to Examples 1, 2 and 3 and Comparative Example 1 were measured and results are shown in Table 1 below. Amounts of the impurities were confirmed by titration using HCl.

TABLE 1

|  | Example 1 | Example 2 (wt %) | Example 3 | Comparative Example 1 |
|---|---|---|---|---|
| $Li_2CO_3$ | 0.140 | 0.101 | 0.109 | 0.130 |
| LiOH | 0.089 | 0.060 | 0.053 | 0.118 |
| total | 0.229 | 0.161 | 0.161 | 0.248 |

As confirmed from results shown in Table 1 above, the cathode active materials of Examples 1, 2 and 3 doped with $Mg^{2+}$, $Sr^{2+}$, and $Ba^{2+}$, respectively, exhibited lower amounts of $Li_2CO_3$ and LiOH as impurities than the cathode active material of Comparative Example 1 excluding a metal cation having an oxidation number of +2. That is, in the cathode active materials respectively doped with $Mg^{2+}$, $Sr^{2+}$, and $Ba^{2+}$, cation mixing in which $Ni^{2+}$ ions are intercalated into Li cation sites is prevented and thus natural loss of $Li^+$ ions may be minimized.

In addition, when comparing the cathode active materials of Examples 1, 2 and 3, it can be confirmed that the amounts of the impurities were reduced more in the cathode active materials respectively doped with $Sr^{2+}$ and $Ba^{2+}$ having greater ionic radius than $Mg^{2+}$. This is assumed to be because $Sr^{2+}$ and $Ba^{2+}$ having greater ionic radius than $Mg^{2+}$ are mainly positioned in an empty space within a crystal lattice rather than at Li cation sites and thus a movement path for $Ni^{2+}$ ions is more efficiently blocked.

EXPERIMENTAL EXAMPLE 2

X-ray diffraction analysis was performed using the cathode active materials of Example 2 and Comparative Examples 1 and 2 prepared through sintering at 890° C., 900° C., and 910° C., and results are shown in Table 2 below and FIG. 1.

TABLE 2

| Intensity | (003)/(014) | 2θ difference |
|---|---|---|
| Example 2 (890° C.) | 2.35 | 33.2 |
| Example 2 (900° C.) | 2.39 | 33.2 |
| Example 2 (910° C.) | 2.47 | 33.2 |
| Comparative Example 1 (910° C.) | 2.37 | 33.2 |
| Comparative Example 2 (890° C.) | 1.98 | 32.5 |

As confirmed from the results shown in Table 2 above, the ratio (003)/(014) of the cathode active material of Example 2 prepared through sintering at 910° C. is greater than that of the cathode active material of Comparative Example 1, while the ratio (003)/(014) of the cathode active material of Comparative Example 2 is smaller than that of the cathode active material of Comparative Example 1.

This means that ordering more strongly occurs in the cathode active material of Example 2 prepared through sintering at 910° C. than in the cathode active material of Comparative Example 1 and that the cathode active material of Comparative Example 2 forms an α-$NaFeO_2$-type (space group R3m) structure, but ordering does not completely occur.

Meanwhile, the ratio (003)/(014) of the cathode active material of Example 2 prepared through sintering at 890° C. is similar to that of the cathode active material of Comparative Example 1. In summary, it can be confirmed that the cathode active material of Example 2 including Sr is prepared through sintering at a lower temperature than the cathode active material of Comparative Example 1.

EXAMPLE 4

The cathode active material of Example 2, a conductive material, and a binder were weighed so as to have a weight ratio of 95:2.5:2.5 and added to NMP and mixed therein to prepare a cathode mixture. The cathode mixture was coated onto Al foil having a thickness of 20 μm to a thickness of 200 μm and the coated Al foil was rolled and dried, thereby completing fabrication of an electrode.

The electrode was subjected to blanking into a coin shape, and the coin-shaped electrode, Li metal as an anode, and a carbonate electrolyte containing 1 M LiPF$_6$ were used to manufacture a coin-type cell.

EXAMPLE 5

A coin-shaped cell was manufactured in the same manner as in Example 4, except that the cathode active material of Example 3 was used.

COMPARATIVE EXAMPLE 3

A coin-shaped cell was manufactured in the same manner as in Example 4, except that the cathode active material of Comparative Example 1 was used.

EXPERIMENTAL EXAMPLE 3

The coin-shaped cells manufactured according to Examples 4 and 5 and Comparative Example 3 were subjected to 50 charging and discharging cycles under the following conditions: at 45° C., charging at 0.5 C, and discharging at 1.0 C and lifespan characteristics thereof were compared. Capacity retention ratios according to cycles were measured and results are illustrated in FIG. 2.

As illustrated in FIG. 2, it can be confirmed that the cells of Examples 4 and 5 including the cathode active materials respectively doped with $Sr^{2+}$ and $Ba^{2+}$ exhibited superior lifespan characteristics to those of the cell of Comparative Example 3 including the doping metal cation-free cathode active material. That is, after 50 cycles, the cells of Examples 4 and 5 exhibited relatively low reduction in capacity retention ratio. From the results, it can be confirmed that natural loss of $Li^+$ ions is minimized through doping of a space within a crystal lattice with $Sr^{2+}$ or $Ba^{2+}$, which results in enhanced structural stability.

EXPERIMENTAL EXAMPLE 4

Storage characteristics of the cells of Examples 4 and 5 and Comparative Example 3 were compared. After storing the cells of Examples 4 and 5 and Comparative Example 3 at 60° C. for 1 week, power changes thereof at 70% SOC were measured. Results are illustrated in FIG. 3. Referring to FIG. 3, it can be confirmed that the cells of Examples 4 and 5 show smaller changes in power at 70% SOC than the cell of Comparative Example 3 including the doping metal cation-free cathode active material. That is, it can be confirmed that the cells of Examples 4 and 5 have excellent storage characteristics through doping with $Sr^{2+}$ and $Ba^{2+}$, respectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

A cathode active material according to the present invention includes a metal cation at a Li cation site or in an empty space within a crystal lattice, in terms of crystal structure, and thus, structural stability may be enhanced and natural loss of Li cations may be minimized.

Thus, in a lithium secondary battery including the cathode active material, swelling due to impurities $Li_2CO_3$ and LiOH produced according to natural loss of Li cations is minimized and safety enhancement effects are obtained.

In addition, in a method of preparing the cathode active material, synthesis temperature of the cathode active material may be reduced by addition of an alkaline earth metal and thus productivity enhancement effects are obtained.

A secondary battery according to the present invention includes, as a cathode active material, a lithium composite transition metal oxide doped with an alkaline earth metal and thus, even when stored for extended periods of time, natural reduction in capacity is minimized, which results in enhanced storage characteristics.

The invention claimed is:

1. A cathode active material represented by Formula 1 below and comprising a metal cation having a greater ionic radius than a Ni cation and represented by M of Formula 1 at a Li cation site or in an empty space within a crystal lattice so as to prevent mixing of Ni cations into a Li layer,
wherein the cathode active material further comprises a Li-containing compound,
wherein an amount of the Li-containing compound is greater than 0 and less than or equal to 0.161 wt % based on a total weight of the cathode active material and the Li-containing compound is $Li_2CO_3$ and/or LiOH:
the cathode active material is prepared by a method comprising the steps of sintering a mixture of a transition metal source and a lithium source in air, wherein the mixture comprises an alkaline earth metal source having an oxidation number of +2 so that the sintering is performed at 890° C. to 930° C., and
the alkaline earth metal is Sr or Ba:

$$Li_aNi_xMn_yCo_zM_wO_{2-t}A_t \qquad \text{(Formula 1)}$$

wherein $0 \leq a \leq 1.2$, $0 < x \leq 0.9$, $0 < y \leq 0.9$, $0 < z \leq 0.9$, $0 < w \leq 0.3$, $2 \leq a+x+y+z+w \leq 2.3$, $x>y$, $x>z$, and $0 \leq t<0.2$;

M is $Sr^{2+}$ or $Ba^{2+}$; and
A is at least one monovalent or divalent anion.

2. The cathode active material according to claim 1, wherein, in Formula 1, $y+z \leq 0.6$.

3. The cathode active material according to claim 2, wherein, in Formula 1, $y+z \leq 0.44$.

4. The cathode active material according to claim 1, wherein M is $Sr^{+2}$.

5. The cathode active material according to claim 1, wherein M is $Ba^{2+}$.

6. The cathode active material according to claim 1, wherein the Ni cation is $Ni^{2+}$.

7. The cathode active material according to claim 1, wherein an X-ray diffraction peak ratio (003)/(014) of the cathode active material of Formula 1 is greater than that of a cathode active material represented by Formula 2 below prepared under the same sintering temperature conditions:

$$Li_aNi_xMn_yCo_zO_{2-t}A_t \qquad (2)$$

wherein $0 \leq a \leq 1.2$, $0 < x \leq 0.9$, $0 < y \leq 0.9$, $0 < z \leq 0.9$, $a+x+y+z=2$, $x>y$, $x>z$, and $0 \leq t<0.2$;

and
A is at least one monovalent or divalent anion.

8. A cathode mixture for secondary batteries, comprising the cathode active material according to claim 1.

9. A cathode for secondary batteries in which the cathode mixture according to claim 8 is coated on a current collector.

10. A lithium secondary battery comprising the cathode according to claim 9.

11. The lithium secondary battery according to claim 10, wherein the lithium secondary battery has a capacity retention ratio with respect to initial capacity of 85% or more at 50 cycles performed under the following conditions: at 45° C., charging at 0.5 C and discharging at 1.0 C.

12. A battery module comprising the lithium secondary battery according to claim 10 as a unit cell.

13. A battery pack comprising the battery module according to claim 12.

14. A device using the battery pack according to claim 13 as a power source.

* * * * *